United States Patent
Choi (10) Patent No.: US 12,295,068 B2
(45) Date of Patent: May 6, 2025

(54) SERVER FOR PROVIDING MULTI-SERVICE, WIRELESS COMMUNICATION SYSTEM HAVING THE SAME AND OPERATING METHOD THEREOF

(71) Applicant: SAMSUNG ELECTRONICS CO., LTD., Suwon-si (KR)

(72) Inventor: Hyungwook Choi, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 161 days.

(21) Appl. No.: 17/885,864

(22) Filed: Aug. 11, 2022

(65) Prior Publication Data

US 2023/0217231 A1 Jul. 6, 2023

(30) Foreign Application Priority Data

Dec. 30, 2021 (KR) .................. 10-2021-0193036

(51) Int. Cl.
*H04W 4/80* (2018.01)
*H04W 8/00* (2009.01)

(52) U.S. Cl.
CPC ............ *H04W 8/005* (2013.01); *H04W 4/80* (2018.02)

(58) Field of Classification Search
CPC ............................... H04W 8/005; H04W 4/80
USPC ...................................................... 455/41.2
See application file for complete search history.

(56) References Cited

U.S. PATENT DOCUMENTS

| | | |
|---|---|---|
| 6,372,608 B1 | 4/2002 | Shimoda et al. |
| 6,645,830 B2 | 11/2003 | Shimoda et al. |
| RE38,466 E | 3/2004 | Inoue et al. |
| 6,818,465 B2 | 11/2004 | Biwa et al. |
| 6,818,530 B2 | 11/2004 | Shimoda et al. |
| 6,858,081 B2 | 2/2005 | Biwa et al. |
| 6,967,353 B2 | 11/2005 | Suzuki et al. |
| 7,002,182 B2 | 2/2006 | Okuyama et al. |
| 7,084,420 B2 | 8/2006 | Kim et al. |
| 7,087,932 B2 | 8/2006 | Okuyama et al. |
| 7,154,124 B2 | 12/2006 | Han et al. |
| 7,208,725 B2 | 4/2007 | Sherrer et al. |
| 7,288,758 B2 | 10/2007 | Sherrer et al. |
| 7,319,044 B2 | 1/2008 | Han et al. |
| 7,501,656 B2 | 3/2009 | Han et al. |
| 7,709,857 B2 | 5/2010 | Kim et al. |
| 7,759,140 B2 | 7/2010 | Lee et al. |
| 7,781,727 B2 | 8/2010 | Sherrer et al. |
| 7,790,482 B2 | 9/2010 | Han et al. |
| 7,940,350 B2 | 5/2011 | Jeong |
| 7,959,312 B2 | 6/2011 | Yoo et al. |
| 7,964,881 B2 | 6/2011 | Choi et al. |

(Continued)

FOREIGN PATENT DOCUMENTS

KR 10-2018-0116967 A 10/2018

*Primary Examiner* — April G Gonzales
(74) *Attorney, Agent, or Firm* — Sughrue Mion, PLLC (57) ABSTRACT

A wireless communication system includes a server supporting multi-service, multi-advertising, and multi-connection and a plurality of client devices simultaneously receiving a first advertising signal and a second advertising signal from the server through Bluetooth Low Energy (BLE) communication, wherein the first advertising signal includes a first media access control (MAC) address, and the second advertising signal includes a second MAC address different from the first MAC address.

19 Claims, 9 Drawing Sheets

(56) References Cited

U.S. PATENT DOCUMENTS

| | | | |
|---|---|---|---|
| 7,985,976 | B2 | 7/2011 | Choi et al. |
| 7,994,525 | B2 | 8/2011 | Lee et al. |
| 8,008,683 | B2 | 8/2011 | Choi et al. |
| 8,013,352 | B2 | 9/2011 | Lee et al. |
| 8,049,161 | B2 | 11/2011 | Sherrer et al. |
| 8,129,711 | B2 | 3/2012 | Kang et al. |
| 8,179,938 | B2 | 5/2012 | Kim |
| 8,263,987 | B2 | 9/2012 | Choi et al. |
| 8,324,646 | B2 | 12/2012 | Lee et al. |
| 8,399,944 | B2 | 3/2013 | Kwak et al. |
| 8,432,511 | B2 | 4/2013 | Jeong |
| 8,459,832 | B2 | 6/2013 | Kim |
| 8,502,242 | B2 | 8/2013 | Kim |
| 8,536,604 | B2 | 9/2013 | Kwak et al. |
| 8,735,931 | B2 | 5/2014 | Han et al. |
| 8,737,917 | B2 | 5/2014 | Desai et al. |
| 8,766,295 | B2 | 7/2014 | Kim |
| 8,983,384 | B2 | 3/2015 | Miller |
| 9,961,484 | B2 | 5/2018 | Choi et al. |
| 9,986,495 | B2 | 5/2018 | Gu et al. |
| 10,225,098 | B2* | 3/2019 | Gu .................... H04W 8/005 |
| 10,616,765 | B2* | 4/2020 | Ziv .................... H04W 12/02 |
| 2009/0327713 | A1* | 12/2009 | Marin .................. H04W 12/50 |
| | | | 713/168 |
| 2011/0107404 | A1* | 5/2011 | Ramsdell ............ H04L 12/1403 |
| | | | 726/5 |
| 2013/0091452 | A1* | 4/2013 | Sorden .................... G06F 30/20 |
| | | | 715/771 |
| 2013/0178163 | A1* | 7/2013 | Wang ................ H04W 52/0293 |
| | | | 455/41.2 |
| 2014/0323048 | A1* | 10/2014 | Kang ...................... H04W 4/80 |
| | | | 455/41.2 |
| 2014/0351832 | A1* | 11/2014 | Cho ...................... H04L 67/141 |
| | | | 719/328 |
| 2015/0127340 | A1* | 5/2015 | Epshteyn ................ G10L 21/00 |
| | | | 704/235 |
| 2015/0188940 | A1* | 7/2015 | Lapidous ............ H04L 63/0272 |
| | | | 726/25 |
| 2015/0189511 | A1* | 7/2015 | Lapidous ............ H04L 63/0272 |
| | | | 726/15 |
| 2016/0219507 | A1* | 7/2016 | Hughes ................ H04W 52/02 |
| 2017/0201931 | A1* | 7/2017 | Swanzey ................ A61B 5/002 |
| 2017/0251506 | A1* | 8/2017 | Lewis .................... H04W 8/005 |
| 2017/0272270 | A1* | 9/2017 | Gu ........................ H04B 17/318 |
| 2018/0117446 | A1* | 5/2018 | Tran ........................ G06F 1/163 |
| 2018/0264347 | A1* | 9/2018 | Tran ........................ G06V 40/28 |
| 2019/0277529 | A1* | 9/2019 | Madonna ................ F24F 11/46 |
| 2019/0361917 | A1* | 11/2019 | Tran .................... H04W 12/108 |
| 2020/0045519 | A1* | 2/2020 | Raleigh ................ H04W 4/08 |
| 2021/0144265 | A1* | 5/2021 | Asakura ................ H04W 76/11 |
| 2021/0185633 | A1* | 6/2021 | Ogawa .................. H04W 4/023 |

* cited by examiner

FIG. 1

| Security Level | Service | MAC ADD |
|---|---|---|
| High Level | Service 1, 2 | MAC ADD1 |
| Low Level | Service 3, 4, and 5 | MAC ADD2 |

SERVER FOR PROVIDING MULTI-SERVICE, WIRELESS COMMUNICATION SYSTEM HAVING THE SAME AND OPERATING METHOD THEREOF

CROSS-REFERENCE TO RELATED APPLICATION

This application is based on and claims priority under 35 U.S.C. § 119 to Korean Patent Application No. 10-2021-0193036 filed on Dec. 30, 2021 in the Korean Intellectual Property Office, the disclosure of which is incorporated by reference herein in its entirety.

BACKGROUND

Example embodiments of the disclosure relate to a server for providing multi-service, a wireless communication system including the server, and a method of operating the wireless communication system.

With the rapid growth of the Internet of Things (IoT) market, the fields to which IoT is applied have also rapidly increased. Wireless communication technology between devices for enabling communications between the Internet of Things (IoT) and communication devices has been improved. Bluetooth is a wireless technology standard for short-range data exchange between fixed or mobile devices and personal area networks (PANs). Bluetooth low energy (BLE) is a wireless personal area network technology specified by the Bluetooth special interest group (SIG) for new applications in the healthcare, fitness, location beacons, security and home entertainment industries. As compared to conventional Bluetooth, BLE has been developed to significantly reduce power consumption and costs while maintaining a similar communication range. Generally, since a smartphone supports a Bluetooth function, short-distance communication services using the function have increased. Generally, by connecting an app (APP) in the smartphone to a corresponding communication device using Bluetooth technology, a circular structure in which the status of the device may be requested to be read or changed and the obtained information may be provided on the app. However, since the service defined by a service provider may not be compatible with the service of other service providers, it may be difficult for a single Bluetooth slave device to support multiple services.

SUMMARY

An example embodiment of the disclosure is to provide a server for providing multi-service improving security, a wireless communication system having the same, and a method of operating the same.

In accordance with an aspect of the disclosure, an operating method of a wireless communication system includes transmitting a first advertising signal for a first service group to a client device; transmitting a second advertising signal for a second service group to the client device while transmitting the first advertising signal; receiving a connection instruction corresponding to one of the first advertising signal and the second advertising signal from the client device; requesting a service discovery corresponding to the connection instruction from the client device; and transmitting a response message corresponding to the service discovery to the client device, wherein the first advertising signal includes a first media access control (MAC) address, and the second advertising signal includes a second MAC address different from the first MAC address.

In accordance with an aspect of the disclosure, a wireless communication system includes a server configured to support multi-service, multi-advertising, and multi-connection; and a plurality of client devices configured to simultaneously receive a first advertising signal and a second advertising signal from the server through Bluetooth low energy (BLE) communication, wherein the first advertising signal includes a first media access control (MAC) address and the second advertising signal includes a second MAC address different from the first MAC address.

In accordance with an aspect of the disclosure, a server configured to support a multi-service includes a Bluetooth low energy (BLE) module configured to perform BLE communication with a plurality of client devices; a first database configured to store a first table necessary for driving at least one first service corresponding to a first service group; and a second database configured to store a second table necessary for driving at least one second service corresponding to a second service group, wherein the BLE module uses a first media access control (MAC) address when transmitting a first advertising signal corresponding to the at least one first service, and uses a second MAC address different from the first MAC address when transmitting a second advertising signal corresponding to the at least one second service.

In accordance with an aspect of the disclosure, a device configured to manage a plurality of Internet of Things (IoT) devices includes three or more service groups; and a Bluetooth low energy (BLE) module configured to perform BLE communication with each of the plurality of IoT devices, wherein each of the three or more service groups provides, to the plurality of IoT devices, a respective advertising signal including a media access control (MAC) address corresponding to a different security level than a security level of each other MAC address.

In accordance with an aspect of the disclosure, a multi-service server includes a first database corresponding to a first service supported by the server; and a second database corresponding to a second service supported by the server, wherein the server is configured to transmit a first advertising signal including a first media access control (MAC) address that corresponds to the first service, and wherein the server is configured to transmit a second advertising signal including a second MAC address that corresponds to the second service.

BRIEF DESCRIPTION OF DRAWINGS

The above and other aspects, features, and advantages of certain embodiments of the disclosure will be more apparent from the following detailed description, taken in combination with the accompanying drawings, in which.

DETAILED DESCRIPTION

Hereinafter, embodiments of the disclosure will be described as below with reference to the accompanying drawings.

It will be understood that when an element or layer is referred to as being "over," "above," "on," "below," "under," "beneath," "connected to" or "coupled to" another element or layer, it can be directly over, above, on, below, under, beneath, connected or coupled to the other element or layer or intervening elements or layers may be present. In contrast, when an element is referred to as being "directly over," "directly above," "directly on," "directly below," "directly under," "directly beneath," "directly connected to" or "directly coupled to" another element or layer, there are no intervening elements or layers present. Like numerals refer to like elements throughout.

Spatially relative terms, such as "over," "above," "on," "upper," "below," "under," "beneath," "lower," and the like, may be used herein for ease of description to describe one element's or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

For the sake of brevity, conventional elements to semiconductor devices may or may not be described in detail herein for brevity purposes.

At least one of the components, elements, modules or units (collectively "components" in this paragraph) represented by a block in the drawings may be embodied as various numbers of hardware, software and/or firmware structures that execute respective functions described above, according to an example embodiment. According to example embodiments, at least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components. Functional aspects of the above example embodiments may be implemented in algorithms that execute on one or more processors. Furthermore, the components represented by a block or processing steps may employ any number of related art techniques for electronics configuration, signal processing and/or control, data processing and the like.

Generally, the Internet of Things (IoT) may refer to a network among things using wired/wireless communication. Therefore, the IoT in example embodiments may be referred to by various terms such as an IoT network system, a ubiquitous sensor network (USN) communication system, a machine type communications (MTC) communication system, a machine oriented communication (MOC) communication system, a machine to machine (M2M) communication system, or a device to device (D2D) communication system. The IoT network system in example embodiments may include an IoT device, an access point (AP), a gateway, a communication network, a server, and the like. However, these components are classified as above simply to describe the IoT network system, and an example embodiment thereof is not limited thereto. Also, the IoT network system may use an application protocols such as transmission protocols such as user datagram protocol (UDP) and transmission control protocol (TCP), IPv6 low-power wireless personal area networks (6LoWPAN) protocol, IPv6 internet routing protocol, and constrained application protocol (CoAP), hypertext transfer protocol (HTTP), application protocols such as message queue telemetry transport (MQTT) and MQTT for sensors networks (MQTT-S) for information communication between two or more components within an IoT network system.

In a wireless sensor network (WSN), each of a plurality of IoT devices may be used as a sink node or a sensor node. A sink node, also known as a base station, may work as a gateway connecting the WSN to an external network (e.g., the Internet), may assign a task to each sensor node, and may collect an event sensed by each sensor node. A sensor node may be provided in a WSN, and may be configured to process and gather sensory information. The sensor node may be a node performing communication between nodes connected to each other within the WSN.

A server for providing multi-service, a wireless communication system having the same and a method of operating the same may relate to a BLE communication technique supporting a plurality of Bluetooth low energy (BLE) services (or applications). A server for providing multi-service, a wireless communication system having the same and a method of operating the same in an example embodiment may support multimedia access control (MAC) address, multi-advertising, multi-connection, and multi-database to support the plurality of BLE services. The server for providing multi-service, a wireless communication system having the same and a method of operating the same may enhance security against external attacks by independently operating a database. Also, the server for providing multi-service, a wireless communication system having the same and a method of operating the same may fundamentally block access to the database by classifying the MAC addresses used according to the security level.

Figure 1:
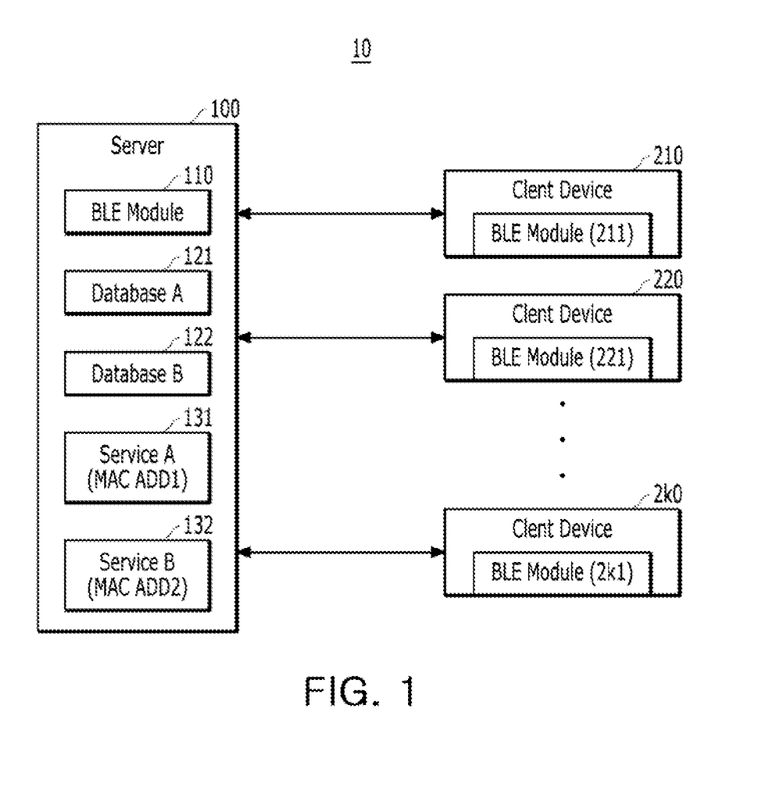
FIG. 1 is a diagram illustrating a wireless communication system according to an embodiment.

FIG. 1 is a diagram illustrating a wireless communication system according to an example embodiment. Referring to FIG. 1, the wireless communication system 10 may include a server 100 and a plurality of client devices 210, 220, ..., 2k0 (k is an integer equal to or greater than 2).

The server 100 may be implemented to provide a plurality of wireless communication services. The server 100 may include a communication module 110 supporting a wireless communication service. The communication module 110 may be implemented to support short-range communication. The short-distance communication may be implemented as one of Bluetooth communication, infrared communication, visible light communication, human body communication or intermediary communication, Zigbee communication, near field communication (NFC) communication, and radio frequency identification (RFID) communication. Hereinafter, the wireless communication service may be implemented as a Bluetooth low energy (BLE) service. To provide two or more BLE services, the server 100 may be implemented to support multi-advertising and multi-connection.

In an example embodiment, the server 100 may independently output two advertising signals corresponding to different services 131 and 132 simultaneously. The advertising signals may include different MAC addresses. Generally, the MAC address may be a physical address operating on a data link layer. For example, a first advertising signal corresponding to service group A (Service A, 131) may include a first MAC address (MAC ADD1), and a second advertising signal corresponding to service group B (Service B, 132) may include a second MAC address (MAC ADD2). In an example embodiment, the first MAC address MAC ADD1 may be configured as a public MAC address, and the second MAC address MAC ADD2 may be configured as a random MAC address. As another example, the first MAC address MAC ADD1 may be configured as a random MAC address, and the second MAC address MAC ADD2 may be configured as a public MAC address. The public MAC address and the random MAC address may be independent values.

In an example embodiment, the server 100 may select one of the first MAC address MAC ADD1 and the second MAC address MAC ADD2 according to a security level of a supported service. For example, when a service of a relatively low security level (e.g., a first security level) needs to be provided, the server 100 may select the first MAC address MAC ADD1 and may output a corresponding advertising signal. When a service of a relatively high security level (e.g., second security level) needs to be provided, the server 100 may select the second MAC address MAC ADD2 and may output a corresponding advertising signal. The above-described relationship between security levels and MAC addresses may be merely an example embodiment, and an example embodiment thereof is not limited thereto.

Also, the server 100 may be implemented to allow access to different databases 121 and 122 according to the connection corresponding to the different services 131 and 132. For example, when a client device requesting the service A 131 is connected to the server 100, the server 100 may allow the connected client device to access the first database 121. Also, when the client device requesting the service B 132 is connected to the server 100, the server 100 may allow the connected client device to access the second database 122.

The server 100 may be referred to as a data service device, a slave device, a slave server, a conductor, a host device, a gateway, a sensing device, a monitoring device, and the like.

Each of the plurality of client devices 210, 220, ..., 2k0 may perform wireless communication with the server 100 using BLE technology. Generally, BLE technology may greatly reduce power consumption through a low data rate and may enable data communication. The plurality of client devices 210, 220, ..., 2k0 may include communication modules 211, 221, ..., 2k1 performing a communication function, respectively.

The client device 210, 220, ..., 2k0 may include at least one of a smartphone, a tablet personal computer, a mobile phone, a videophone, an e-book reader, a desktop personal computer (PC), a laptop personal computer (PC), a netbook computer, a personal digital assistant (PDA), a portable multimedia player (PMP), an MP3 player, a mobile medical device, a camera, or a wearable device (e.g. a head mounted device such as electronic glasses) device (HMD), an electronic clothing, an electronic bracelet, an electronic necklace, an electronic accessory, an electronic tattoo, a smart watch, and the like.

Also, the client device may be implemented as a smart home appliance having a communication function (smart home appliance). Smart home appliances may include at least one of a television, a digital video disk (DVD) player, an audio device, a refrigerator, an air conditioner, a vacuum cleaner, an oven, a microwave, a washing machine, an air purifier, a set-top box, a TV box (e.g., at least one of Samsung HomeSync™, Apple TV™, and Google TV™), game consoles, an electronic dictionary, an electronic key, a camcorder, an electronic picture frame, and a smart light, for example.

Also, the client device may include at least one of various medical devices (e.g., magnetic resonance angiography (MRA), magnetic resonance imaging (MRI), computed tomography (CT), imagers, ultrasound machines, and the like), navigation devices, a global positioning system (GPS) receiver, event data recorder (EDR), a flight data recorder (FDR), an automotive infotainment device, marine electronic equipment (e.g., marine navigation system, gyro compass, and the like), avionics, a security device, a vehicle head unit, an industrial or home robot, an automatic teller machine (ATM) of a financial institution, or a point of sales (POS) of a store.

Also, the client device may include at least one of furniture or a building/structure including a communication function, an electronic board, an electronic signature receiving device, a projector, or various measuring devices. (e.g., water, electricity, gas, or a radio wave measuring device, and the like). The client device in example embodiments may be one or more combinations of the aforementioned various devices.

A client device may be referred to as a master device, a master, a client, a sensing device, a sink device, a collector, or the like.

A related art general wireless communication system may provide a plurality of services using a single MAC address. Accordingly, a related art general wireless communication system may support multi-advertising, but the number of actually possible service connections may be fixed to one. Also, there may be a difficulty in detecting an advertising channel in which an indication is generated during BLE connection. Also, when the BLE connection is successful, the client device connected to the server may check entirety of databases of the server.

The wireless communication system 10 in an example embodiment may be designed to operate as two independent servers by applying two different BLE MAC addresses to the server 100. Also, the wireless communication system 10 in an example embodiment may support a plurality of BLE services by dividing the BLE services according to a security level. Also, the wireless communication system 10 in an example embodiment may support multi-advertising and multi-connection for each advertising. Also, in the wireless communication system 10 in an example embodiment, only a predefined and necessary database may be viewed during BLE connection.

The wireless communication system 10 in an example embodiment may exhibit the same effect as using two or more devices as a single device. Also, the wireless communication system 10 in example embodiments may enable service connection independently to different devices using BLE technology based on multi-advertising and multi-connection technology using independent MAC addresses. Also, the wireless communication system 10 in example embodiments may satisfy security requirements of each service in detail.

Figure 2A:
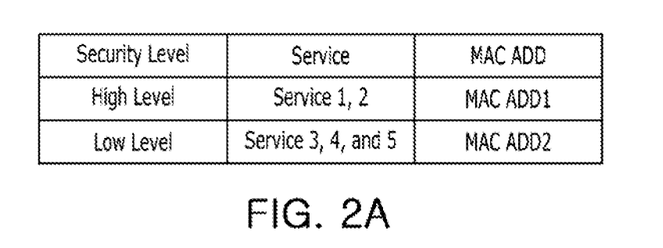
FIGS. 2A, 2B, and 2C are diagrams illustrating a MAC address and a corresponding service according to a security level according to an embodiment.
Figure 2B:
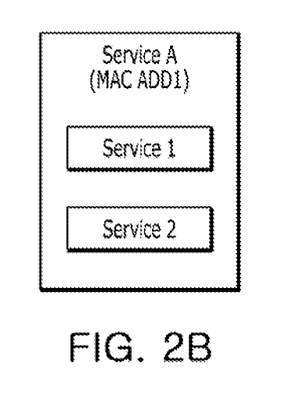
Figure 2C:
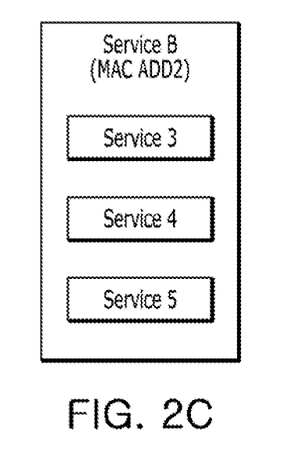

FIGS. 2A, 2B, and 2C are diagrams illustrating a MAC address and a corresponding service according to a security level according to an example embodiment.

Referring to FIG. 2A, each of the first and second services provided by a server according to an embodiment may require a relatively high security level. In this case, the advertising signals corresponding to the first and second services, respectively, may use the first MAC address MAC ADD1. Also, each of the third, fourth, and fifth services provided by the server may require a relatively low security level. In this case, the advertising signals corresponding to the third, fourth, and fifth services may use the second MAC address MAC ADD2.

FIG. 2B illustrates first and second services of service group A requiring a relatively high security level. FIG. 2C illustrates third, fourth, and fifth services of service group B requiring a relatively low security level.

Figure 3A:
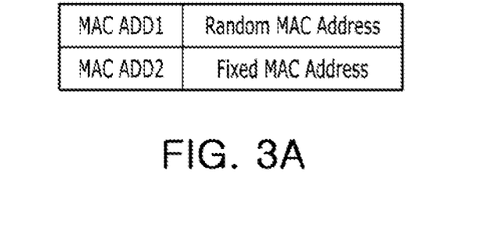
FIG. 3A is a diagram illustrating an example embodiment of first and second MAC addresses.
Figure 3B:
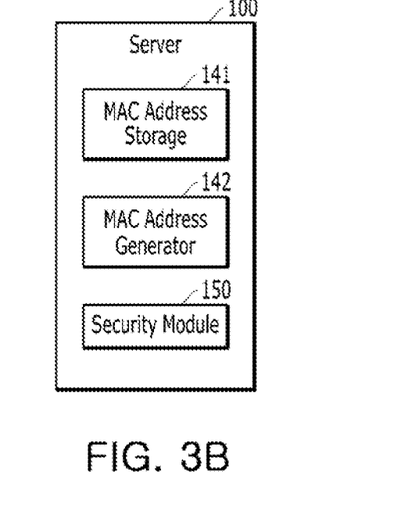
FIG. 3B is a diagram illustrating a server related to a MAC address.

FIG. 3A is a diagram illustrating an example embodiment of first and second MAC addresses, and FIG. 3B is a diagram illustrating a server 100 related to a MAC address.

Referring to FIG. 3A, the first MAC address MAC ADD1 may be configured as a random MAC address. The random MAC address may be periodically/aperiodically generated in various manners if desired. The second MAC address MAC ADD2 may be configured as a fixed MAC address.

Referring to FIG. 3B, the server 100 may include a storage 141, a MAC address generator 142, and a security module 150. The storage 141 may be implemented to store a fixed MAC address. The MAC address generator 142 may be implemented to generate a random MAC address under control of the security module 150. The security module 150 may determine whether to generate a random MAC address according to the type of service. The MAC address generator and the security module 150, respectively or in combination, may be implemented by at least one processor which may be a central processing unit (CPU), an application processor (AP), a system-on-chip (SoC), an integrated circuit, or the like embodied as hardware, software, and/or firmware.

Figure 4:
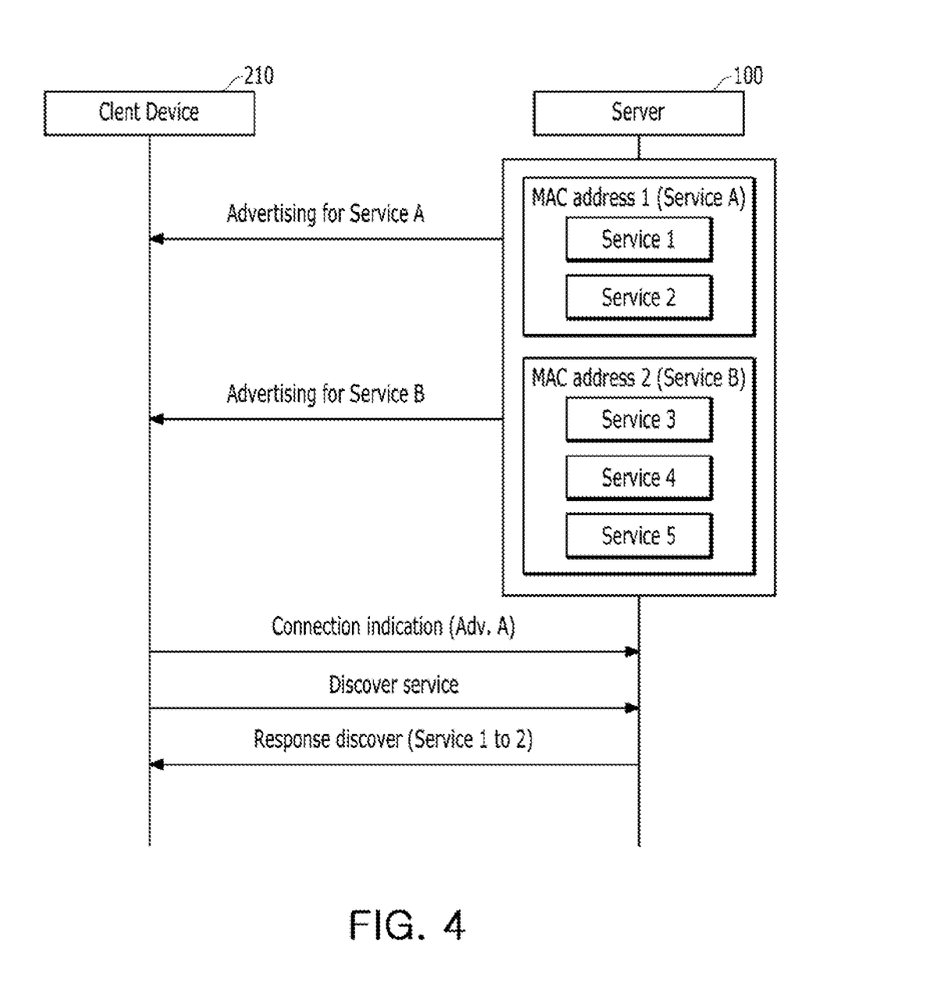
FIG. 4 is a diagram illustrating a service providing method of a wireless communication system according to an embodiment.

FIG. 4 is a diagram illustrating a service providing method of a wireless communication system 10 according to an example embodiment.

The server 100 may start BLE Advertising for service A in a state in which power is turned on. The server 100 may output a first advertising signal corresponding to the first service group Service A. In this case, the first advertising signal may include the first MAC address MAC ADD1. The first service group Service A may include first and second services Service 1 and Service 2.

Also, the server 100 may start BLE advertising for the second service group Service B in a state in which power is turned on. The server 100 may output a second advertising signal corresponding to Service B. In this case, the second advertising signal may include a second MAC address MAC ADD2. The second service group Service B may include third, fourth, and fifth services Service 3, Service 4, and Service 5.

The server 100 may simultaneously output BLE advertisement for the first service group Service A and the second service group Service B. That is, the server 100 may simultaneously provide multi-service broadcasting.

The client device 210 may receive the first and second advertising signals and may select a desired service. The client device 210 may, for example, indicate the server 100 to connect the first service group Service A.

The server 100 may perform an authentication operation in response to a connection request. When the authentication operation is completed, the server 100 may connect the first and second services Service 1 and Service 2 of the first service group Service A to the client device 210. The client device 210 may generate a limited right of reading the BLE database according to the connection to each service.

When connected to the first service group Service A, the corresponding BLE connection may not view the database for the second service group Service 2. In an example embodiment, the service groups may have different security levels. For example, the security level may be determined by a BLE pairing option.

Connection and disconnection to each service in the wireless communication system 10 in an example embodiment may operate independently without interfering with each other. The wireless communication system 10 in example embodiments may organically respond to changes in a plurality of services. Also, the wireless communication system in example embodiments may enable an efficient software structure design by independently applying a security level.

Figure 5:
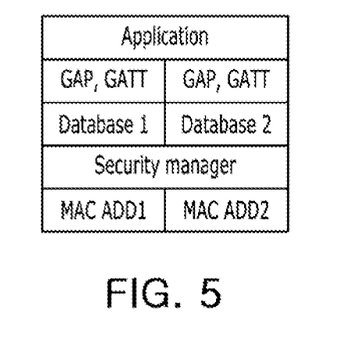
FIG. 5 is a diagram illustrating a structure of software of a server according to an embodiment.

FIG. 5 is a diagram illustrating a structure of software of a server according to an example embodiment. Referring to FIG. 5, the software stack may include an application, a generic access profile (GAP)/generic attribute profile (GATT), a database, a security manager, and a link layer.

The application may be implemented on an upper end of generic access profile (GAP) or generic attribute profile (GATT). Bluetooth may be basically divided into a host (e.g., GATT, attribute protocol (ATT), logical link control and adaptation protocol (L2CAP)) and a controller. The host may perform high-level protocols such as security functions. A controller (e.g., a link layer or a physical layer) may perform low-level functions such as link management or basic operation on a physical channel. The host may include the remainder of the application.

GAP may directly communicate with the application. In the GAP, idle (IDLE) and connecting mode procedures may be defined. While the connected mode procedure manages the connection to the device, the idle mode procedure may include the discovery of Bluetooth devices. GAP may also provide high-level security procedures such as encryption of connections.

ATT may define communication between two devices performing respective roles of a server and a client on a dedicated L2CAP channel. The server may manage a set of attributes. Attributes may be a data structure storing information managed by GATT operating on an upper end of ATT. Attributes may be different from slave or master roles. For example, attributes may include an attribute handle, an attribute type, an attribute value, and attribute permissions. A client may access a server's attributes by sending a request triggering a response message to the server.

ATT may include a message type ATT (request, response, command, notification, indication, confirmation). The request message may be a message for requesting and transferring specific information from the client device to the server device, and the response message may be a response message to the request message, and may refer to a message being transmitted from the server device to the client device. The command message may be transmitted from the client device to the server device to mainly indicate a command of a specific operation. The server device may not transmit a response to the command message to the client device. The Notification message may be a message transmitted from the server device to the client device for notification such as an event, and the client device may not transmit a confirmation message for the Notification message to the server device. The indication and confirmation messages may be transmitted from the server device to the client device for notification/instruction, such as an event. Differently from the notification message, the client device may transmit a confirmation message for the indication message to the server device. The server may also transmit unacknowledged notifications and indications and an indication which informs a client to send a confirmation to a client. Also, the client may send a command to the server to write a value of the attribute.

GATT may define a framework used by ATT for service discovery and exchange of characteristics between one device and another device. Here, characteristics may be a data set including values and properties. Data related to services and characteristics may be stored in attributes. L2CAP may be a protocol which may establish and manage logical links related to upper layer protocols and applications using links established in the link layer. Transport functions of logical links managed in L2CAP may include logical channel management, protocol multiplexing, packet fragmentation and reconstruction, QoS, and grouping. A plurality of ATTs may be defined in the upper layer protocol operating using the above-mentioned functions. Logical channel may refer to a channel established for data transmitted from a layer protocol or application above L2CAP.

The database may be divided into a first database Database 1 and a second database Database 2. The first database may be a first table corresponding to the first security level, and the second database may be a second table corresponding to the second security level. The first table may store values necessary for driving the first service group. Also, the second table may store values necessary for driving the second service group. The database may be implemented to allow access to the client according to the security level corresponding to the connected service. In terms of software, the database may be divided according to the security level, such that the database may be physically divided.

The security manager may provide overall security functions necessary for server security or user authentication. A security manager may be a protocol for authenticating client devices and providing key distribution. For example, the security manager may perform an authentication operation upon a service request from a client. The security manager may select a MAC address according to the service. In an example embodiment, the security manager may generate a random MAC address for a service having a high security level. The random MAC address may be periodically generated.

The link layer may control the state of the Bluetooth low energy device. The link layer may be managed by MAC address. The link layer may enter a standby state, an advertising state, a scanning state, an initiating state, and a connection state. The advertising state may allow the BLE device to discover or connect to other devices, or to broadcast user data. Advertisements are introduced in the BLE section of the Bluetooth specification 4.0. Three channels, such as, for example, channels 37, 38, and 39, may be reserved for sending advertisements. The advertisements may be transmitted to the channel in sequence. The device listening to the advertisements may need to be in a scanning state. The initiating state may be entered to initiate a connection state and the connection state may actively participate in connection. The standby state may enter safe power consumption when no messages are exchanged. Also, the link layer may be responsible for transmission, framing, and error prevention on specific links, and may perform error detection and correction functions.

As illustrated in FIG. 5, the software stack in example embodiments configures an independent database, BLE GAP, and GATT using two MAC addresses simultaneously (MACADD1/MAC ADD2), thereby completely linking the advertising channel to the connection channel. That is, one device may operate as two different devices operating independently.

Figure 6:
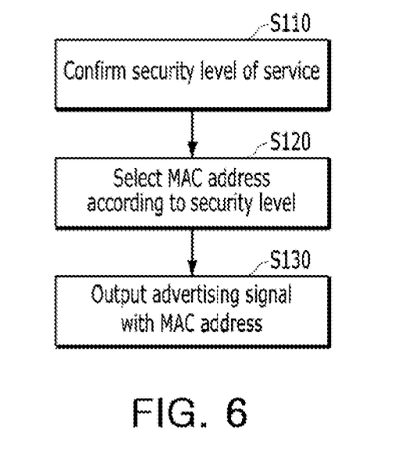
FIG. 6 is a flowchart illustrating operations of a server according to an embodiment.

FIG. 6 is a flowchart illustrating operations of a server according to an example embodiment. Referring to FIGS. 1 to 6, the server 100 may operate BLE as below. Generally, the BLE operation may be divided into a device filtering procedure, an advertising procedure, a scanning procedure, a discovery procedure, a connecting procedure, and the like. The BLE operation may be an operation related to an advertising procedure. The server 100 may check the security level of the service (S110). The server 100 may select a MAC address according to the security level (S120). The MAC address may be one of a fixed MAC address and a random MAC address. The server 100 may output an advertising signal using the selected MAC address (S130).

Figure 7:
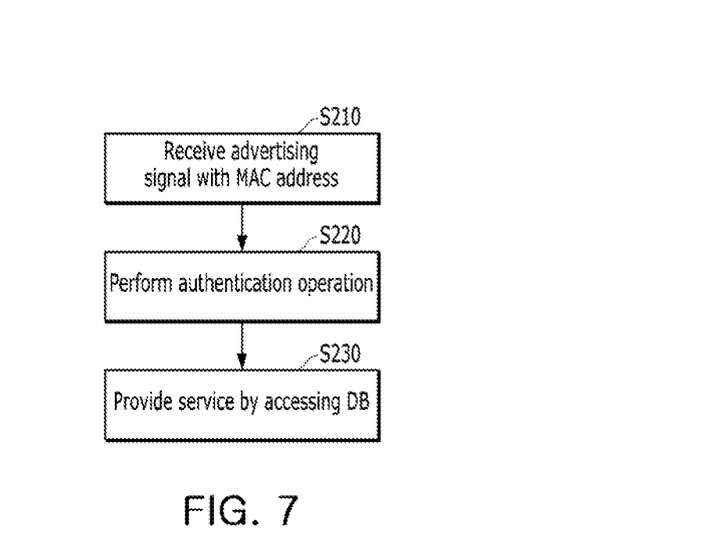
FIG. 7 is a flowchart illustrating operations of a client device according to an embodiment.

FIG. 7 is a flowchart illustrating operations of a client device according to an example embodiment. Referring to FIGS. 1 to 7, the client device 210 may operate as below.

The client device 210 may simultaneously receive the first and second advertising signals from the server 100. The advertising signals may include different MAC addresses (S210). The client device 210 may perform an authentication operation with the server 100 to receive a desired service (S220). After the authentication operation is completed, the client device 210 may receive a target service by accessing the database of the server 100 according to the MAC address (S230).

In FIGS. 1 to 7, the server 100 may provide multi-connection and multi-service to access two databases with two MAC addresses MAC ADD1 and MAC ADD2, respectively. However, the number of multi-connection and multi-service in example embodiments is not limited thereto.

Figure 8:
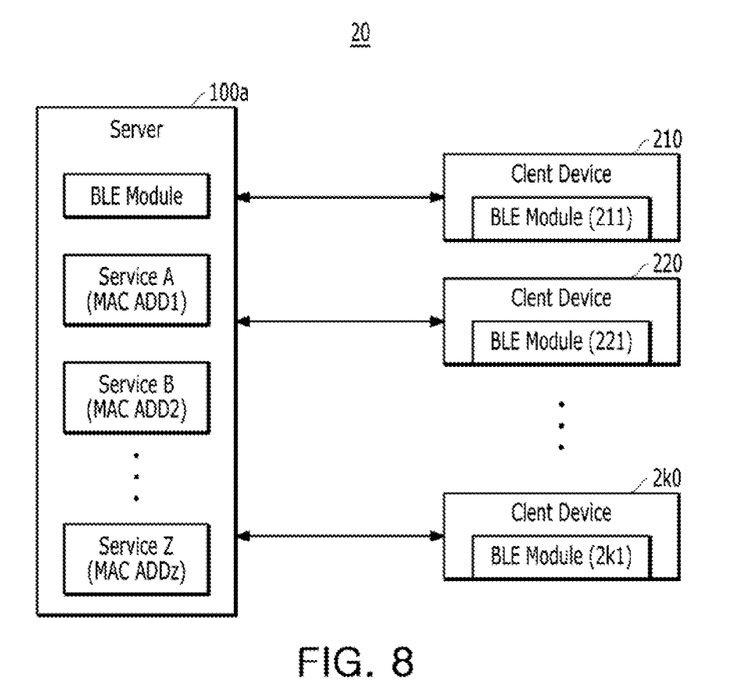
FIG. 8 is a diagram illustrating a wireless communication system according to an embodiment.

FIG. 8 is a diagram illustrating a wireless communication system according to an example embodiment. Referring to FIG. 8, the wireless communication system 20 may include a server 100a supporting three or more service groups using different MAC addresses MAC ADD1, MAC ADD2, . . . , MAC ADDz (z is an integer of 3 or more) compared to the example in FIG. 1. The service groups may be driven by different security levels, respectively.

The wireless communication system 20 illustrated in FIG. 8 may be configured as a device for managing a plurality of Internet of Things (IoT) devices 210, 220, . . . , 2k0. The wireless communication system 20 may include a BLE module performing Bluetooth low energy (BLE) communication to each of three or more service groups and a plurality of IoT devices. Each of the service groups may provide an advertising signal having a media access control (MAC) address corresponding to the plurality of IoT devices having different security levels. In other words, each of the service groups may correspond to a different respective MAC address and a different respective security level.

The wireless communication system in an example embodiment may be applicable to a home network system having a smart electronic device and an AI speaker.

Figure 9:
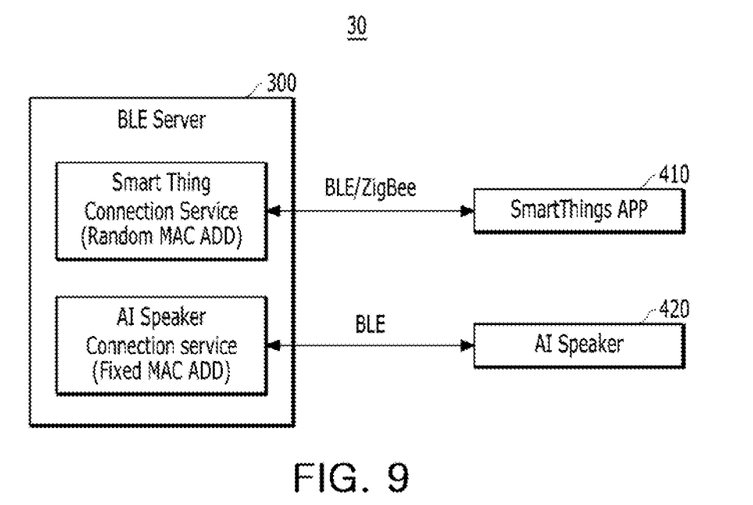
FIG. 9 is a diagram illustrating a home network system according to an embodiment.

FIG. 9 is a diagram illustrating a home network system according to an example embodiment. Referring to FIG. 9, the home network system 30 may include a BLE server 300, a smart electronic device (SmartThings APP) 410, and an AI speaker 420.

The BLE server 300 may be implemented to provide a smart thing connection service and an AI speaker connection service. The smart thing connection service may use a random MAC address. Also, the AI speaker connection service may use a fixed MAC address.

The smart electronic device 410 may be implemented to drive a smart application for performing BLE/ZigBee communication with the BLE server 300. AI speaker 420 may be implemented to perform BLE communication with the BLE server 300.

Figure 10:
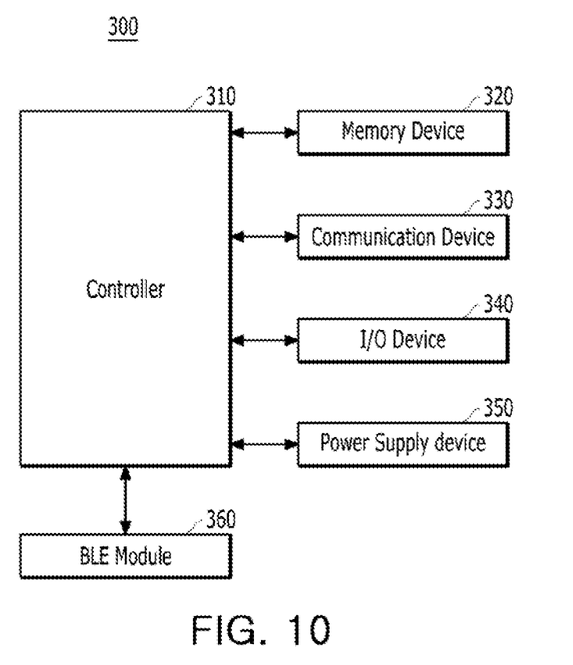
FIG. 10 is a diagram illustrating a BLE server according to an embodiment.

FIG. 10 is a diagram illustrating a BLE server 300 according to an example embodiment. Referring to FIG. 10, the BLE server 300 may include a controller 310, a memory device 320, a communication device 330, an input/output device 340, a power supply device 350, and a BLE module 360.

The controller 310 may be implemented to control overall operations of the BLE server 300. For example, the controller 310 may control to process a message requested to be transmitted and received through the Bluetooth interface and other communication interfaces. In an example embodiment, the controller 310 may include an application-specific integrated circuit (ASIC), another chipset, a logic circuit, and/or a data processing device.

The controller 310 may be implemented as a digital signal processor (DSP), a microprocessor, or a time controller (TCON) for processing a digital signal. Also, the controller 310 may include at least one of a central processing unit (CPU), a microcontroller unit (MCU), a micro processing unit (MPU), an application processor (AP), a graphics-processing unit (GPU) or a communication processor (CP), and an ARM processor. Also, the controller 310 may be implemented as at least one system on chip (SoC) or at least one large-scale integration (LSI) circuit in which an algorithm is embedded, or in the form of a field programmable gate array (FPGA). Also, the controller 310 may perform various functions by executing computer executable instructions stored in the memory device 320.

The memory device 320 may be implemented to temporarily store data generated when the BLE server 300 operates. The memory 320 may store control command codes, control data, or user data. The memory 320 may include at least one of a volatile memory and a nonvolatile memory. The non-volatile memory may include read only memory (ROM), programmable ROM (PROM), electrically programmable ROM (EPROM), electrically erasable and programmable ROM (EEPROM), flash memory, phase-change RAM (PRAM), magnetic RAM (MRAM), resistive RAM (RRAM), ferroelectric RAM (FRAM), and the like. The volatile memory may include at least one of various types of memories such as dynamic RAM (DRAM), static RAM (SRAM), synchronous DRAM (SDRAM), phase-change RAM (PRAM), magnetic RAM (MRAM), resistive RAM (RRAM), ferroelectric RAM (FeRAM), or the like.

The communication device 330 may be implemented to process a wired/wireless signal. Also, the communication device 330 may include a baseband circuit for processing radio signals.

The input/output device 340 may be implemented to perform a data input or data output function.

The power supply 350 may be implemented to provide power to the BLE server 300. The power supply 350 may further include a function of charging by wired or wireless manners. For example, the power supply 350 may include a battery performing wired/wireless charging.

The BLE module 360 may be implemented to transmit a request/response, a command, a notification, and an instruction/confirmation message or data between devices using Bluetooth technology. The BLE module 360 may be embodied as various numbers of hardware, software and/or firmware structures (e.g., SoC) that execute the above-described functions. The BLE module 360 may include at least one of a digital modem and a radio frequency (RF) modem for BLE communication.

Figure 11:
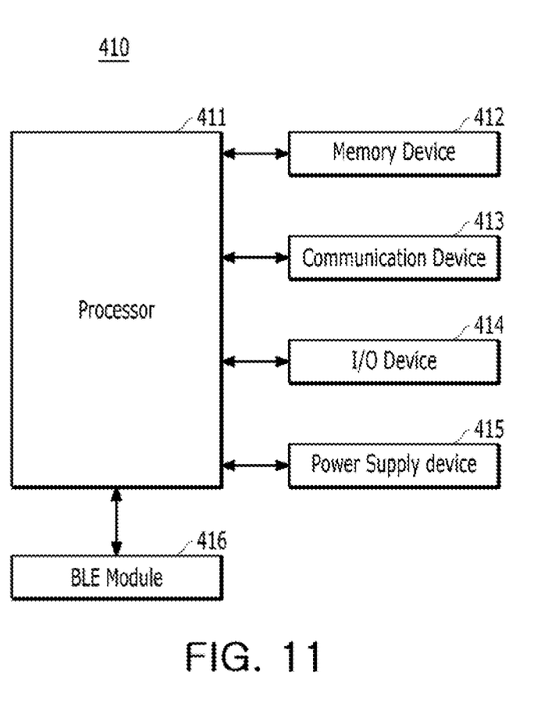
FIG. 11 is a diagram illustrating a smart electronic device according to an embodiment.

FIG. 11 is a diagram illustrating a smart electronic device according to an example embodiment. Referring to FIG. 11, the smart electronic device 410 may include a processor 411, a memory device 412, a communication device 413, an input/output device 414, a power supply device 415, and a BLE module 416.

The processor 411 may receive an advertising signal from the BLE server 300, and may transmit a scan request message to the BLE server 300 by controlling the communication device 413, and may receive a scan response message in response to the scan request from the BLE server 300.

Also, the processor 411 may control the communication device 413 to transmit a connect request message to the BLE server 300 for establishing a Bluetooth connection with the BLE server 300. Also, the processor 411 may control the communication device 413 to read or write data using the attribute protocol ATT and GAP from the BLE server 300 after the BLE connection through the connection procedure. The processor may be implemented by at least one of a CPU, an MCU, an AP, a GPU, a CP and an ARM processor.

The communication device 413 may include a modem communication interface accessible to a mobile cellular network, such as a local area network (LAN), Bluetooth, wireless fidelity (Wi-Fi), a wireless local area communication interface such as Zigbee, a power line communication (PLC) or 3G/4G/5G/6G ($3^{rd}/4^{th}/5^{th}/6^{th}$ Generation).

The power supply device 415 may be implemented to supply power required for operation of each component by receiving internal power. The power supply 415 may have a small duty cycle in the BLE technology, and may greatly reduce power consumption through a low data rate.

The smart electronic device 410 in example embodiments may include home appliances such as a refrigerator, a washing machine, an air conditioner, security/safety devices such as door lock, CCTV, intercom, window sensor, fire detection sensor, electric plug, or the like, entertainment devices such as TVs, audio, game consoles, computers, or the like, and office equipment such as printers, projectors, copiers, and various electronic or sensing devices.

Example embodiments may be applicable to an IoT module (ITM) product. An ITM may include a LED driver, a LED module, an IC card, a smart card, a remote-control apparatus, an electric switch for light, a lighting control apparatus, an integrated circuit module, computer software, LED light bulbs, a LED luminary, a lighting fixture, a lighting apparatus and installations.

Figure 12:
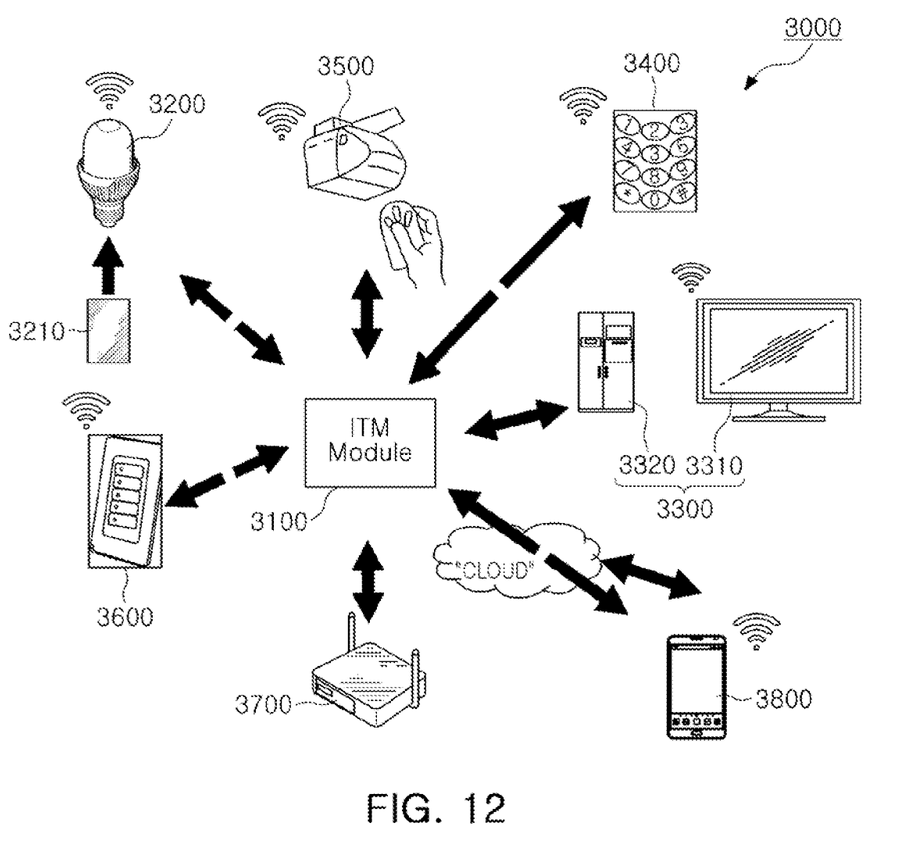
FIG. 12 is a diagram illustrating a network system according to a BLE communication method according to an embodiment.

FIG. 12 is a diagram illustrating a network system 3000 according to a BLE communication method according to an example embodiment.

Referring to FIG. 12, the network system 3000 may be connected to communicate with an ITM module 3100 for processing data transmitted and received according to different communication protocols, and may include a plurality of devices 3300, 3400, 3500, 3600, 3700, and 3800 connected to communicate with the ITM module 3100 according to various wireless communication methods. To implement the network system 3000 based on the Internet of Things environment, each of the devices 3300-3800 including, for example, the LED lamp 3200 may include at least one communication module. In an example embodiment, the LED lamp 3200 may be connected to be able to communicate with the ITM module 3100 by a wireless communication protocol such as Wi-Fi, Zigbee, LiFi, and the like, and to this end, the LED lamp 3200 may include at least one lamp communication module 3210.

As described above, the network system 3000 may be applied to a closed space such as a home or office and also an open space such as a street or a park. When the network system 3000 is applied to a home, a plurality of devices 3300-3800 included in the network system 3000 and connected to communicate with the ITM module 3100 based on the Internet of Things technology may include a home appliance 3300, a digital door lock 3400, a garage door lock 3500, a switch 3600 for lighting installed on the wall, a router 3700 for wireless communication network relay, and a mobile device 3800 such as smartphones, tablets, and laptop computers.

In the network system 3000, the LED lamp 3200 may check an operating status of various devices 3300-3800 using a wireless communication network (Zigbee, WiFi, LiFi, and the like) installed at home, or may automatically adjust illuminance of the LED lamp 3200 depending on the surrounding environment/circumstances. Also, the devices 3300-3800 included in the network system 3000 may be controlled using Li-Fi communication using visible light emitted from the LED lamp 3200.

First, the LED lamp 3200 may automatically adjust illuminance of the LED lamp 3200 based on the surrounding environment information transmitted from the ITM module 3100 through the lamp communication module 3210, or the surrounding environment information collected from the sensor mounted on the LED lamp 3200. For example, lighting brightness of the LED lamp 3200 may be automatically adjusted according to the type of program being broadcast on the TV 3310 or brightness of the screen. To this end, the LED lamp 3200 may receive operation information of the television 3310 from the lamp communication module 3210 connected to the ITM module 3100. The lamp communication module 3210 may be modularized integrally with a sensor and/or a controller included in the LED lamp 3200.

For example, when the value of the program aired in the TV program is a human drama, the lighting according to a preset setting value may also be lowered to a color temperature of 12000K or less, such as, for example, 5000K, such that color may be adjusted and cozy atmosphere may be created. When the program value is a gag program, the network system 3000 may be configured such that the color temperature may be increased to 5000K or more according to the illumination setting value and may be adjusted to a blue-based white light.

Also, when a predetermined period of time elapses after the digital door lock 3400 is locked in a state in which there is no person at home, waste of electricity may be prevented by turning off all of the turned-on LED lamps 3200. Alternatively, when the security mode is set through the mobile device 3800, and the digital door lock 3400 is locked while no one is at home, the LED lamp 3200 may be maintained in the turned-on state.

The operation of the LED lamp 3200 may be controlled according to the surrounding environment collected through various sensors connected to the network system 3000. For example, when the network system 3000 is implemented in a building, the lighting, the location sensor and the communication module may be combined in the building such that the location information of people in the building may be collected to turn the lighting on or off, or the collected information may be provided in real time such that facility management or idle space may be efficiently used. Generally, a device such as the LED lamp 3200 may be disposed in almost of spaces of each floor in the building, various information in the building may be collected through the sensor provided integrally with the LED lamp 3200 and may use the information for facility management and idle space.

Also, by combining the LED lamp 3200 and the image sensor, storage device, and lamp communication module 3210, the combination of devices may be used as a device for maintaining building security or detect and responding to emergency situations. For example, when a smoke sensor or a temperature sensor is attached to the LED lamp 3200, damage may be reduced by quickly detecting whether a fire has occurred. Also, brightness of the lighting may be adjusted in consideration of external weather or sunlight and energy may be saved, and a comfortable lighting environment may be provided.

As described above, the network system 3000 may be applied to a closed space such as a home, an office, or a building or an open space such as a street or a park. When the network system 3000 is to be applied to an open space without physical limitations, it may be relatively difficult to implement the network system 3000 according to the distance limitation of wireless communication and communication interference caused by various obstacles. By mounting a sensor and a communication module in each lighting fixture and using each lighting fixture as an information collecting means and a communication intermediary means, the network system 3000 may be implemented efficiently in the open environment as described above.

Since a related art general wireless communication system may not specify an accurate advertising channel when a BLE connection occurs, an access to all databases included therein may be provided, which may cause vulnerability in security. In the wireless communication system in an example embodiment, by classifying MAC addresses to be used according to security levels and blocking an access to the database, at the source, security may be strengthened.

According to the aforementioned example embodiments, a server for providing multi-service, a wireless communication system having the same and a method of operating the same may, by providing multi-services and multi-databases using different MAC addresses according to security levels, improve security.

While example embodiments have been illustrated and described above, it will be apparent to those skilled in the art that modifications and variations could be made without departing from the scope of the disclosure as defined by the appended claims.

What is claimed is:

1. An operating method of a wireless communication system, the wireless communication system comprising a server configured to support multi-service, the method comprising:
   transmitting, by the server, a first advertising signal corresponding to at least one first service, included in the multi-service, to a client device;
   transmitting, by the server, a second advertising signal corresponding to at least one second service, included in the multi-service, to the client device while transmitting the first advertising signal;
   receiving, by the server, a connection instruction corresponding to one of the first advertising signal and the second advertising signal from the client device;
   requesting, by the server, a service discovery corresponding to the connection instruction from the client device; and
   transmitting, by the server, a response message corresponding to the service discovery to the client device,
   wherein the transmitting the first advertising signal comprises selecting, by the server, a first media access control (MAC) address based on the at least one first service being included in a first service group, and transmitting the first advertising signal comprising the first MAC address, and the transmitting the second advertising signal comprises selecting, by the server, a second MAC address based on the at least one second service being included in a second service group, and transmitting the second advertising signal comprising the second MAC address, the second MAC address being different from the first MAC address.

2. The method of claim 1, wherein each of the first advertising signal and the second advertising signal is transmitted by Bluetooth Low Energy (BLE).

3. The method of claim 1,
   wherein the first service group corresponds to a first database and the second service group corresponds to a second database, and
   wherein the first database and the second database operate independently of each other.

4. The method of claim 1, wherein a first security level corresponding to the first service group is different from a second security level corresponding to the second service group.

5. The method of claim 4, further comprising, before the transmitting of the first advertising signal and the transmitting of the second advertising signal, checking a security level corresponding to a supported service based on receiving the connection instruction from the client device.

6. The method of claim 5, wherein the selecting the first MAC address or the selecting the second MAC address comprises:
   selecting one of the first MAC address and the second MAC address according to the security level.

7. The method of claim 4, wherein the first security level is higher than the second security level.

8. The method of claim 1,
   wherein the first MAC address comprises a random MAC address, and
   wherein the second MAC address comprises a fixed MAC address.

9. The method of claim 8, further comprising:
   periodically generating the first MAC address.

10. A wireless communication system, comprising:
    a server configured to support multi-service, multi-advertising, and multi-connection; and
    a plurality of client devices, each client device of the plurality of client devices being configured to simultaneously receive, from the server through Bluetooth low energy (BLE) communication, a first advertising signal corresponding to at least one first service, included in the multi-service, and a second advertising signal corresponding to at least one second service, included in the multi-service,
    wherein the server is configured to select a first media access control (MAC) address based on the at least one first service being included in a first service group and transmit the first advertising signal comprising the first MAC address, and select a second MAC address based on the at least one second service being included in a second service group and transmit the second advertising signal comprising the second MAC address, the second MAC address being different from the first MAC address.

11. The wireless communication system of claim 10, wherein the server is configured to select one of the first MAC address and the second MAC address according to a security level of a supported service based on receiving a connection request from a client device of the plurality of client devices.

12. The wireless communication system of claim 10, wherein the server comprises:
    at least one processor configured to implement:
    a MAC address generator configured to periodically generate the first MAC address; and
    a processor configured to determine a security level of a supported service based on receiving a connection request from a client device of the plurality of client devices and to select a MAC address according to the security level; and
    a storage configured to store the second MAC address.

13. The wireless communication system of claim 10, wherein the server comprises:
    a first database corresponding to the first MAC address; and
    a second database corresponding to the second MAC address.

14. The wireless communication system of claim 10, wherein the multi-service comprises a Smart Things connection service and an AI speaker connection service.

15. A server configured to support a multi-service, the server comprising:
    a Bluetooth low energy (BLE) module configured to transmit, to a client device through BLE communication, a first advertising signal corresponding to at least one first service and transmit a second advertising signal corresponding to at least one second service;
    a first database configured to store a first table necessary for driving the at least one first service; and
    a second database configured to store a second table necessary for driving the at least one second service,
    wherein the BLE module uses, based on the at least one first service being included in a first service group, a first media access control (MAC) address to transmit the first advertising signal, and uses, based on the at least one second service being included in a second service group, a second MAC address different from the first MAC address to transmit the second advertising signal.

16. The server of claim 15, wherein a security level of the first service group is different from a security level of the second service group.

17. The server of claim 15, further comprising:
at least one processor configured to implement a security module configured to determine a security level of the at least one first service and a security level of the at least one second service, and to select one of the first MAC address and the second MAC address according to the security level.

18. The server of claim 15, wherein the BLE module is configured to simultaneously output the first advertising signal and the second advertising signal.

19. The server of claim 15, wherein the first database operates at a first security level and the second database operates independently of the first database at a second security level different from the first security level.

* * * * *